(12) United States Patent
Friswell

(10) Patent No.: US 8,529,639 B2
(45) Date of Patent: Sep. 10, 2013

(54) LIQUID DYE FORMULATIONS IN NON-PETROLEUM BASED SOLVENT SYSTEMS

(75) Inventor: Michael R. Friswell, Wayne, NJ (US)

(73) Assignee: Sunbelt Corporation, Rock Hill, SC (US)

( * ) Notice: Subject to any disclaimer, the term of this patent is extended or adjusted under 35 U.S.C. 154(b) by 141 days.

(21) Appl. No.: 12/938,446

(22) Filed: Nov. 3, 2010

(65) Prior Publication Data

US 2011/0044748 A1 Feb. 24, 2011

Related U.S. Application Data

(62) Division of application No. 11/935,162, filed on Nov. 5, 2007, now Pat. No. 7,842,102.

(51) Int. Cl.
*D06P 3/34* (2006.01)

(52) U.S. Cl.
USPC ............. 8/521; 8/506; 106/31.12; 106/31.35

(58) Field of Classification Search
USPC ............................................. 8/521
See application file for complete search history.

(56) References Cited

U.S. PATENT DOCUMENTS

| | | | |
|---|---|---|---|
| 3,435,054 A | 3/1969 | Kranz et al. | |
| 3,476,500 A * | 11/1969 | Litke | 8/524 |
| 3,690,809 A | 9/1972 | Orelup | |
| 3,764,273 A | 10/1973 | Turner et al. | |
| 3,862,120 A | 1/1975 | Orelup | |
| 4,009,008 A | 2/1977 | Orelup | |
| 4,049,393 A | 9/1977 | Orelup | |
| 4,210,414 A | 7/1980 | Hansen et al. | |
| 4,828,571 A | 5/1989 | Pensa et al. | |
| 5,142,030 A | 8/1992 | Zimin et al. | |
| 5,156,653 A | 10/1992 | Friswell et al. | |
| 5,178,672 A | 1/1993 | Miller | |
| 5,466,659 A | 11/1995 | Keeney et al. | |
| 5,552,365 A | 9/1996 | Berneth et al. | |
| 5,558,808 A | 9/1996 | Smith et al. | |
| 5,737,871 A | 4/1998 | Friswell | |
| 5,788,752 A | 8/1998 | Franks | |
| 6,293,977 B1 * | 9/2001 | Caprotti et al. | 44/389 |
| 6,310,002 B1 | 10/2001 | Krzoska et al. | |
| 6,418,852 B2 | 7/2002 | Franks | |
| 6,893,488 B2 | 5/2005 | Arndt | |
| 6,900,253 B2 | 5/2005 | Takao et al. | |
| 6,923,838 B2 | 8/2005 | Maubert et al. | |
| 2003/0118530 A1 * | 6/2003 | O'Brien et al. | 424/63 |
| 2004/0025418 A1 * | 2/2004 | Freisthler | 44/398 |
| 2004/0082684 A1 | 4/2004 | Nagayama et al. | |
| 2007/0267601 A1 | 11/2007 | Zaelke | |

FOREIGN PATENT DOCUMENTS

| | | |
|---|---|---|
| CA | 824049 A | 9/1969 |
| EP | 0 455 370 A2 | 11/1991 |
| EP | 0 672 540 A1 | 9/1995 |
| EP | 1 111 011 A2 | 6/2001 |
| FR | 1 449 236 A | 8/1966 |
| GB | 688000 | 2/1953 |
| WO | 00/16985 A1 | 3/2000 |
| WO | 2005/044924 A1 | 5/2005 |
| WO | 2007/103460 A2 | 9/2007 |

OTHER PUBLICATIONS

COGNIS Application Recommendations, Synlubes Technology, Jan. 2006.

* cited by examiner

*Primary Examiner* — Harold Pyon
*Assistant Examiner* — Katie L Hammer
(74) *Attorney, Agent, or Firm* — Summa, Additon & Ashe, P.A.

(57) ABSTRACT

A method of coloring a substrate is disclosed that includes the steps of dissolving a vegetable oil ester based solvent wherein the ester is selected from a group consisting of esters having carbon chain length of C-1 to C-18 in a liquid solvent dye to form a low-sulfur containing dye formulation such that the vegetable oil ester is present in an amount of between about 5 and 80 percent by weight of the dye formulation, and mixing sufficient amounts of the dye formulation with the substrate to produce mixtures of predetermined color in which the levels of toxic substrate are substantially less than in otherwise equivalent mixtures that include hydrocarbon-based solvents.

3 Claims, No Drawings

LIQUID DYE FORMULATIONS IN NON-PETROLEUM BASED SOLVENT SYSTEMS

RELATED APPLICATIONS

This is a divisional application of Ser. No. 11/935,162 filed Nov. 5, 2007 and now U.S. Pat. No. 7,842,102.

BACKGROUND

The present invention relates to liquid dye formulations that include liquid solvent dyes in non-petroleum based solvent systems such as vegetable oil esters.

Liquid Dye formulations or colorants have widespread commercial uses. In a liquid context, certain dye formulations are particularly useful, for example, writing inks (e.g., soft tip markers), printing inks (e.g., in ink jet printers) and color coding various petroleum fractions for tax purposes, octane/cetane levels and to monitor levels of fuel additives. Liquid dyes have become commercially popular due to their high tinctorial strength (i.e., the amount of color per unit colorant) and ease of handling at the point of application versus powder dyes.

Liquid solvent dyes generally have a tar like consistency at room temperature. Thus, viscosity depressant solvent systems are used to dilute these solvent dyes for manufacturing commercially viable dye formulations.

Those of ordinary skill in the art will know that a dye is a substance that imparts color when dissolved in a substrate (i.e., the product that is dyed). Solvent dyes are soluble in a variety of substrates but insoluble in water. Some of the substrates they are used to color are organic solvents, hydrocarbon fuels, waxes, lubricants and plastics. Their molecules are typically nonpolar or of minimal polarity, and they do not undergo ionization. As defined in Hawley's Condensed Chemical Dictionary, Eleventh Edition, Solvent dyes are organosoluble dyes.

Historically, xylene (mixed and single isomers), high flash aromatic solvents, hydro-treated light naphthenic distillates have been the solvents of choice for oil soluble applications (e.g., petroleum-based applications). For non-petroleum applications, alcohols, straight and branched chain, glycols, glycol ethers, Mineral Spirits and NMP (i.e., N-Methyl Pyrolidinone) have been the solvents of choice. These aforementioned solvent systems present workers and consumers exposure problems due to their toxicity profile. Similarly, the potential environmental impact has to be monitored as well. Government regulations are increasingly demanding that manufacturers investigate their processes and formulations to try to find "greener' alternative technology. Similarly, it is prudent to reduce the use of products whose precursor is crude oil.

Liquid dye formulations have typically used solvents that are amenable to their end use application. An example of this is Solvent Red 164 diluted with mineral oil. This is sold as Navipol Red 164 HF as well as other commercial brands. One of its principal uses is the coloration of automotive transmission fluid (i.e., substrate) to detect leaks in automobile transmissions. In this case, mineral oil is the solvent of choice due to its likeness to the substrate and its compatibility with automotive gaskets and seals.

Traditionally, viscosity depressant solvents were chosen based on their usefulness in the specific end use application and their acceptable solubility and liquid stability to the dye formulation. Thus, their toxicity as well as their impact on the environment was secondary to their functionality.

Recently, however, there has been greater emphasis on manufacturing environment-friendly dye formulations. Environmental programs such as REACH (i.e., Registration, Evaluation, Authorization and Restriction of Chemicals) are being implemented in the European Union. One of the mandates of the REACH program is for chemical manufacturers to systematically replace products containing chemicals that are toxic and harmful to the environment with less toxic products manufactured using improved "greener" technology.

As an example of solvent dye use, in the United States, refiners must adhere to the IRS regulation to mark all off road diesel fuel/heating oil with 26 PPM of Solvent Red 164 to monitor fuel excise tax evasion. Typically, petroleum-based solvents are used for preparing the dye formulations for this purpose. When these petroleum-based dye formulations are used as additives in diesel fuel or heating oil, it increases the total sulfur content of the fuel. This is becoming a problem, particularly for refiners in the United States, who must comply with the EPA (Environment Protection Agency) mandate of 15 PPM of sulfur or less.

In view of the aforementioned, a need exists for non-petroleum based solvents that are useful in specific end use applications (e.g., have acceptable solubility and liquid stability to existing commercially available liquid dyes) but are also environmentally safe and less toxic and do not exceed present or proposed mandates by regulatory agencies.

SUMMARY

In one aspect, the present invention is a dye formulation that uses vegetable oil esters as viscosity depressant solvents.

In another aspect, the present invention is a formulation of commercially available liquid solvent dyes in less toxic non-petroleum based solvent systems.

In yet another aspect, the present invention is a low-sulfur containing dye formulation that meets EPA's mandate of 15 PPM or less of sulfur content.

In yet another aspect, the present invention is a method of coloring a substrate using the dye formulation that includes vegetable oil ester solvent systems.

In yet another aspect, the present invention is a method of using the present dye formulation for printing and other writing purposes.

In yet another aspect, the present invention is a method of using the present dye formulation for tagging substrates.

The foregoing, as well as other objectives and advantages of the present invention and the manner in which the same are accomplished, are further specified within the following detailed description.

DETAILED DESCRIPTION

The invention embraces dye formulations that include non-petroleum based solvent systems such as vegetable oil esters.

In one embodiment, the present invention is a low-sulfur containing dye formulation that includes vegetable oil esters as solvents for commercially available liquid solvent dyes.

As used herein and as described in Hawley's Condensed Chemical Dictionary, Eleventh Edition, the term vegetable oil refers to oil extracted from the seeds, fruit, or nuts of plants and generally considered to be mixture of mixed glycerides. Vegetable oil esters are derived by esterification of vegetable oils. During the esterification process, the fatty acids of vegetable oils undergo esterification reaction. This process uses alcohol and gentle heating to convert vegetable oils into vegetable oil esters.

Those skilled in the art will appreciate that vegetable oil esters as used herein can include synthetically or organically derived esters with properties similar to vegetable oil esters.

The vegetable oil esters used in the present dye formulations replace traditional solvent systems. For petroleum/oil soluble applications the vegetable oil esters replace solvents such as, but not limited to, xylene (mixed and single isomers), high flash aromatic solvents and hydro-treated light naphthenic distillates. For non-petroleum based applications, the vegetable oil esters replace solvents such as, but not limited to, alcohols (straight and branched chain), limonene, mineral spirits and NMP. As compared to the aforementioned traditional solvent systems, vegetable oil esters are less toxic, biodegradable, environmentally friendly and meet the proposed and existing regulations in both the United States and the European Union.

Typically, the dye formulations of the present invention include vegetable oil esters that have carbon chain lengths of C-1 to C-18. More typically, these vegetable oil esters are methyl or ethyl esters.

Some examples of plants from which vegetable oil esters of the present invention are derived include (but are not limited to) corn, cashew nut, oats, lupine, kenaf, calendula, cotton, hemp, soybean, coffee, linseed, hazelnuts, euphorbia, pumpkin seed, coriander, peanut, and the tung oil tree.

Vegetable oil esters are present in the present dye formulation in an amount sufficient to dilute the solvent dye to a liquid consistency.

Further, vegetable oil esters are present in the dye formulation of the present invention in an amount sufficient to keep the toxic levels of the dye formulation within the currently proposed and existing regulations in the United States (e.g., EPA regulations) as well as in European Union (e.g., REACH regulations).

In order to obtain dye formulations with acceptable viscosity and with acceptable sulfur levels, the amount of vegetable oil esters added in the dye formulations of the present invention should be between about 5 and 80 percent by weight of the dye formulation (e.g., between about 30 and 70 percent by weight).

By incorporating vegetable oil esters, the present dye formulations have low amounts of sulfur that comply with acceptable limits pursuant to the United States and European Union regulations. Preferably, the sulfur content of the present dye formulation is less than about 15 PPM, and in some embodiments, less than about 10 PPM (e.g., less than about 5 PPM).

For example, Solvent Red 164 diluted with soybean oil methyl ester to a non-volatile content of 30-70 percent will typically have reduction in total sulfur content to less than about 5 PPM. Whereas, typical commercially available products diluted with xylene, aromatic solvents, or mineral oils usually have sulfur content of about 100-250 PPM.

Typically, the dye formulation of the present invention includes commercially available liquid dyes (i.e., liquid solvent dyes) that are dissolved in the aforementioned vegetable oil ester based solvents.

Some examples of liquid solvent dyes that are used in the present invention include (but are not limited to), the following dyes and their blends:

CI Solvent Red 164—4-(phenylazo)-benzamine and mono-tetramethylated derivatives diazotized and coupled to heptylated 2-Naphthalenol CI Solvent Red 165—Same as the above—Shaded with Solvent Orange 98

CI Solvent Blue 98—9,10 Anthracenedione, 1,4 Mixed Alkyl-Amino

CI Solvent Blue 79—9,10 Anthracenedone, 1,4 Mixed Alkyl-Alkoxy Amino

CI Solvent Orange 98—1,3 Benzenediol, 2,4 bis (alkylphenyl-azo)

CI Solvent Blue 99—2-methoxy-5-methyl-4-{phenylazo}-benzamine diazotized and azo coupled to N-(alkylphenyl)-2 napthalenamine CI Solvent Red—4-(phenyl-azo)-benzamine and mono-tetramethylated derivatives diazotized and coupled to N-(2-ethyl-hexyl)-2-napthalenamine CI Solvent Red—2-Napthaleneamine-N-2-(ethyl-hexyl-1-{{2-methylphenylazo}-phenyl}azo} and mixtures thereof CI Solvent Yellow—3-H-Pyrazol, -3-one, 4-{(4-alkylphenyl)azo}-2,4 dihydro-5-methyl-2 phenyl CI Solvent Black—2 ethylhexyl cupra-amino complex of N-(4 alkylphenyl)-1-{{2-methoxy-5-methyl-4-{(phenyl) azo}-2-Naphthalenamine CI Solvent Yellow—4 alkyl benzamine diazotized and azo coupled to 1:3 benzenediol (2:1)

CI Solvent Red 175—Dinaptho 1,2,3,-cd:1,2,3-lm) perylene-9,18-dion, lauryl derivatives CI Solvent Blue—4{(3-trifluoromethyl-phenyl)azo}-2-methoxy-5-benzaminediazotized and azo coupled to heptylated{N-(4-alkylphenyl)-2-naphthalenamine CI Solvent Red—Benzamine, N-{2-(butoxy)ethyl}-4-(2-chloro-4-nitrophenyl)azo}-N-ethyl CI Solvent Red 161

CI Solvent Yellow 143—3H-Pyrazol-3-one, 4-{(4-alkylphenyl)azo}-2-(chlorophenyl)-2,4 dihydro-5-methyl- CI Solvent Yellow 161—Colbate(1), bis{2 {{2-oxo-1-{(phenylamino carbonyl}-propyl}azo}-phenolate (2-)-hydrogen, C 12-14-tertary alkyl amine salt (1:1)

CI Solvent Black 48—Acetylated{Benzamine, N,N-bis {3-alkoxy-2 hydroxypropyl}-3-hydroxy-4-{{2-methoxy-5-methyl-4-(phenylazo)-phenyl}azo}-, cobalt complex (2:1)}, N-butyl-1 butanamine salt.

CI Solvent Brown 52—Ferrate (1), bis{5-{N,N-bis(3 alkoxy-2-hydroxy propyl)amino}-2-{(5-chloro-2-hydroxy phenyl)azo}-phenolate (2-)}-hydrogen, N-butyl-1 butanamine (1:1) salt.

CI Solvent Red 68—1-[[4-(Phenylazo)phenyl]azo]-2-hydroxy-6,8-naphthalenedisulfonic acid, CI Solvent Red 208—Dibutan-ammonium-bis-[2',2-dioxy-4-di[2"-hydroxy-3"-alkylpropyl]amino-4'-chloroazobenze]-cobalt (alkyl=n-butyl or n-octyl)

CI Solvent Blue 129—Cuprate(2-), [29H,31H-phthalocyanine-C,C-disulfonato(4-)-.kappa.N29,.kappa.N30, .kappa.-N31,.kappa.N32]-, dihydrogen, compd. with 2-ethyl-N-(2-ethylhexyl)-1-hexanamine (1:2)

CI Solvent Blue—Cuprate(2-), [29H,31H-phthalocyanine-C,C-disulfonato(4-)-.kappa.N29,.kappa.N30,.kappa.-N31,.kappa.N32]-, dihydrogen, compd. with 2-ethyl-N-(2-ethylhexyl)-1-hexanamine (1:2) Benzenemethanol, 4-(dimethylamino)-alpha,alpha-bis(4-(dimethylamino)phenyl)-

CI Solvent Black—Benzenemethanol, 4-(dimethylamino)-alpha,alpha-bis(4-(dimethylamino)phenyl)-Ferrate (1-), bis[2-[(4-amino-2-hydroxyphenyl)azo]chlorophenolato (2-)]-, N,N,N'N'-tetrakis[mixed 3-butoxy-2-hydroxypropyl and 2-hydroxy-3-(octyloxy)propyl] derivs., hydrogen compounds with N-butyl-1-butanamine CI Solvent Black—1,3-Benzenediamine, 4,4'-[(4-methyl-1,3-phenylene)bis(azo)]bis[6-methyl-C.I. Solvent Black 7 This substance is identified in the COLOUR INDEX by Colour Index Constitution Number, C.I. 50415:1

CI Solvent Red—Amines, C12-C14-tert-alkyl, bis[2-[(2-hydroxyphenyl)azo]-3-oxo-N-phenylbutamidato(2-)-cobaltate (1-) (1:1) Spiro(isobenzofuran-1(3H), 9'-(9H)xanthen)-3-One, 3',6'bis(diethylamino)-

CI Solvent Yellow—Phenol, 2,6-bis(1-methylpropyl)-4-[(4-nitrophenyl)azo]-

CI Solvent Yellow—Phenol, 2,6-bis(1-methylpropyl)-4-[(3-nitrophenyl)azo]-

CI Solvent Yellow—Phenol, 2,6-bis(1-methylpropyl)-4-[(3-nitro-4-chlorophenyl)azo]-

CI Solvent Yellow—Phenol, 2,6-bis(1-methylpropyl)-4-[(2,4-dinitro-phenyl)azo]-

CI Solvent Yellow—Phenol, 2,6 Disecbutyl-4(3,4 Dichloro Phenyl Azo)-

CI Solvent Yellow—Phenol, 2,6 Disecbutyl-4-(2-Nitro Phenyl Azo)

CI Solvent Yellow—Phenol, 2,6 Disecbutyl-4-(2-chloro-4-Nitro Phenyl Azo

CI Solvent Green—9,10 Anthracenedione, 1,4 (dodecylphenyl)

To assess the commercial viability and the stability of the present liquid dye formulation, the following experiments were conducted:

EXPERIMENT 1

To a two liter three neck round bottom flask equipped for vacuum distillation, 500 grams of Solvent Red 164 also known as Navipol Red 164, a registered trademark of Sunbelt Corporation, was charged. The contents were heated and placed under standard laboratory water aspirator vacuum to remove all the xylene viscosity depressant solvent. The typical maximum temperature used was 110 degrees centigrade. The xylene was replaced with the methyl ester of soybean oil. The contents were tested on a UV-Vis Spectrophotometer. The dye formulation was adjusted with the methyl ester of soybean oil solvent to a tinctorial strength of 580 AU at 515 nanometers for a 32 PPM solution in isooctane. The dye formulation was stored at ambient, 0 and −20 degrees centigrade for 90 days. The dye formulation was completely stable under all conditions.

EXPERIMENT 2

Similarly, various dye formulations according to the present invention were formed using the liquid solvent dyes listed hereinabove. These dye formulations were prepared by replacing traditional viscosity depressant solvents by methyl ester of soybean oil. The resulting dye formulations were also stable when subjected to the same storage stability criteria outlined in Experiment 1.

EXPERIMENT 3

The Navipol Red 164 with the xylene viscosity depressant solvent, utilized in Experiment 1, was tested for total sulfur content. Testing was performed by Gel Laboratories in Charleston, S.C. using method SW 846. The total sulfur content was 170 PPM. The dye formulation in Experiment 1 utilizing the methyl ester of soybean oil (i.e., the dye formulation as disclosed by the present invention) was also tested. The total sulfur content of this dye formulation with methyl ester as soybean oil was reduced to 3.3 PPM. Several other samples were tested with similar results.

EXPERIMENT 4

26 PPM of the dye formulation prepared in Experiment 1 was added to #2 heating oil. The marked heating oil was stored in a similar manner as detailed in Experiment 1. The dye remained dissolved in the heating oil with separation noted. Upon standard analytical testing, the heating oil met all color specifications as required by the U.S. Internal Revenue Service regulations.

In another embodiment, the present invention is a method of tagging substrates using the dye formulation that includes liquid solvent dyes dissolved in vegetable oil ester solvent systems.

U.S. Pat. Nos. 5,737,871 and 5,156,653 disclose the need for tagging organic liquids, particularly petroleum fuel. The disclosures of both these patents are incorporated herein by reference.

Organic liquids, particularly petroleum fuels, are tagged for identification purposes, such as, tax purposes (e.g., road fuel vs. agriculture fuel), product brand identification, and quality control (e.g., octane identification). In many cases, particularly brand identification, tagging helps to identify dilution of a tagged fuel with non-tagged fuel.

The dye solvent of the present invention is tagged by mixing specific quantities of the dye formulation (i.e., a solvent dye dissolved in a vegetable oil ester) to a pre-determined amount of substrate to be tagged. The amounts of dye formulation and the substrate used for this purpose is such that the presence of the dye formulation can be easily detected as and when required for identification of the tagged substrate.

For example, the substrates are tagged with about 2-200 PPM of the liquid dye formulation of the present invention.

Typically, the substrates that are tagged by the aforementioned method include (but are not limited to) gasoline, heating oil, kerosene, stove oil, #2-cycle oil, diesel fuel, paraffin wax, hydrocarbon based marking inks and solvents (e.g., toluene, xylene, isooctane).

For example, Solvent Red 164 is prepared with a vegetable oil ester as its viscosity depressant solvent. 26 PPM of this dye formulation is added to #2 heating oil to meet the United States Internal Revenue Service requirement. The dye formulation is fully miscible and stable in this substrate and has equivalent properties as compared to dye utilizing hydrocarbon based viscosity depressants.

In yet another embodiment, the present invention is a method of using the dye formulation of the present invention for coloring of various substrates (e.g., coloring of automatic transmission fluid to detect leaks in automobile transmissions and coloring of heating oil to differentiate between on-road fuels subject to excise taxes and heating oil and other classes deemed to be tax exempt).

The dye formulation of the present invention generally uses a red solvent dye diluted with vegetable oil ester based solvent system for the coloration of transmission fluid (e.g., Solvent Red 164 is diluted with soybean oil methyl ester to a standard absorbance value of 580 AU for a 32 PPM solution in isooctane).

Typically, automatic transmission fluid is a composition based upon selected grades of petroleum hydrocarbon oils incorporating essential performance additives. Additives include, for instance, anticorrosion agents, antifoaming agents, viscosity improvers and the aforementioned dye formulation. The latter (i.e., the dye formulation) is added to provide an immediately visible characteristic to distinguish the automatic transmission fluid from other oily fluids used in automotive systems including, for example, lubricating, brake and power steering fluids. The nature and degree to which the additives are present in automatic transmission fluid is specified by the automotive manufacturers.

In yet another embodiment, the present invention is a method of using the dye formulation that includes liquid solvent dyes dissolved in vegetable oil ester solvents in writing instruments, for ink jet printing and for coating substrates.

In one embodiment, the present invention is a writing instrument (e.g., felt tip pens) that uses the less toxic dye formulation of the present invention.

In another embodiment, the present invention is an ink jet cartridge filled with the environmentally friendly dye formulation for printing purposes.

In yet another embodiment, the present invention is a surface coated with the aforementioned dye formulation.

In the specification typical embodiments of the invention have been disclosed and, although specific terms have been employed, they have been used in a generic and descriptive sense only and not for purposes of limitation.

The invention claimed is:

1. A method of coloring a substrate comprising the steps of:
    dissolving a vegetable oil ester based solvent wherein the ester is selected from a group consisting of esters having carbon chain length of C-1 to C-18 in a liquid solvent dye in which the vegetable oil ester is present in an amount of between about 5 and 80 percent by weight of the dye formulation, and in which sulfur is present, but in an amount of less than 10 ppm by weight; and
    mixing sufficient amounts of the dye formulation with a substrate selected from the group consisting of transmission fluids, gasoline, heating oil, kerosene, stove oil, #2-cycle oil, diesel fuel, paraffin wax, hydrocarbon based marking inks, wood stain formulations, printing inks, xylene, isooctane and toluene to produce mixtures of predetermined color.

2. A method of coloring a substrate according to claim 1, wherein said liquid solvent dye is selected from the group consisting of CI Solvent Red, CI Solvent Red 2, CI Solvent Red 4, CI Solvent Red 68, CI Solvent Red 161, CI Solvent Red 164, CI Solvent Red 175, CI Solvent Red 208, CI Solvent Red 165, CI Solvent Blue, CI Solvent Blue 4, CI Solvent Blue 79, CI Solvent Blue 98, CI Solvent Blue 99, CI Solvent Blue 129, CI Solvent Orange 98, CI Solvent Yellow, CI Solvent Yellow 3, CI Solvent Yellow 4, CI Solvent Yellow 124, CI Solvent Yellow 143, CI Solvent Yellow 161, CI Solvent Black, CI Solvent Black 2, CI Solvent Black 7, CI Solvent Black 48, CI Solvent Brown 52, CI Solvent Green and their blends.

3. A method of coloring a substrate according to claim 1, wherein said liquid solvent dye is selected from the group consisting of
    a CI Solvent Red 164—4-(phenylazo)-benzamine and mono-tetramethylated derivatives diazotized and coupled to heptylated 2-Naphthalenol,
    a CI Solvent Red 165—4-(phenylazo)-benzamine and mono-tetramethylated derivatives-Shaded with Solvent Orange 98,
    a CI Solvent Blue 98—9,10-Anthracenedione,1-4-Mixed Alkyl-Amino,
    a CI Solvent Blue 79—9,10-Anthracenedione,1,4-Mixed Alkyl-AlkoxyAmino,
    a CI Solvent Orange 98—1,3 Benzenediol, 2,4 bis(alkylphenyl-azo),
    a CI Solvent Blue 99—2-methoxy-5-methyl-4-{phenylazo}-benzamine diazotized and azo coupled to N-(alkylphenyl)-2-napththalenamine,
    a CI Solvent Red—4-(phenyl-azo)-benzamine and mono-tetramethylated derivatives diazotized and coupled to N-(2-ethyl-hexyl)-2-napthalenamine,
    a CI Solvent Red—2-Napthalenenamine-N-(2-ethyl-hexyl)-1-{{2-methyl-4-{(2-methy-lphenyl)azo}-phenyl}azo} and mixtures thereof,
    a CI Solvent Yellow—3-H-Pyrazol,-3-one, 4-{(4-alkylphenyl)azo}-2,4 dihydro-5-methyl-2 phenyl,
    a CI Solvent Black—2-ethylhexyl cupra-amino complex of N-(4-alkylphenyl)-1-{{2-methoxy-5-methyl-4-{(phenyl)azo}-2-Naphthalenamine,
    a CI Solvent Yellow—4-alkyl benzamine diazotized and azo coupled to 1:3 benzenediol (2:1),
    a CI Solvent Red 175—Dinaptho(1,2,3,-cd:1,2,3,-Im) perylene-9,18-dion,lauryl derivatives,
    a CI Solvent Blue—4{(3-trifluoromethyl-phenyl)azo}-2-methoxy-5 methyl-benzenamine diazotized and azo coupled to heptylated{N-(4 alkyl phenyl)-2-naphthalenamine},
    a CI Solvent Red—Benzamine,N-{2-(butoxy)ethyl}-4-(2-chloro-4 nitrophenyl) azo}-N-ethyl, a CI Solvent Red 161,
    a CI Solvent Yellow 143—3H-Pyrazol-3-one,4-{(4-alkylphenyl)azo}-2-(chlorophenyl)-2,4 dihydro-5-methyl,
    a CI Solvent Yellow 161—Colbate (1),bis{2{{2-oxo-1-{(phenylamino carbonyl}-1-propyl}azo}-phenolate (2-)-, hydrogen, C 12-14-tertiary alkyl amine salt (1:1),
    a CI Solvent Black 48—Acetylated{Benzamine, N,N-bis{3-alkoxy-2 hydroxypropyl}-3-hydroxy-4-{{2-methoxy-5-methyl-4-(phenylazo)-phenyl}azo}- , cobalt complex (2:1)},N-butyl-1 butanamine salt,
    a CI Solvent Brown 52—Ferrate (1), bis{5-{N,N-bis(3 alkoxy-2-hydroxy propyl)amino}-2-{(5-chloro-2-hydroxy phenyl)azo}-phenolate (2-)}-hydrogen, N-butyl-1 butanamine (1:1) salt,
    a CI Solvent Red 68—1-[[4-(Phenylazo)phenyl]azo]-2-hydroxy-6,8-naphthalenedisulfonic acid,
    a CI Solvent Red 208—Dibutan-ammonium-bis-[2',2-dioxy-4-di[2"-hydroxy-3"-alkylpropyl]amino-4'-chloroazobenze]-cobalt (alkyl=n-butyl or n-octyl),
    a CI Solvent Blue 129—Cuprate(2-), [29H,31H-phthalocyanine-C,C-disulfonato(4-)-.kappa.N29,.kappa.N30, .kappa.-N31,.kappa.N32]-, dihydrogen, compd. with 2-ethyl-N-(2-ethylhexyl)-1-hexanamine (1:2),
    a CI Solvent Blue—Cuprate2-), [29H,31H-phthalocyanine-C,C-disulfonato(4-)-.kappa.N29,.kappa.N30, .kappa.- N31,.kappa.N32]-, dihydrogen, compd. with 2-ethyl-N-(2-ethylhexyl)-1-hexanamine (1:2) Benzenemethanol, 4-(dimethylamino)-alpha,alpha-bis(4-(dimethylamino)phenyl),
    a CI Solvent Black—Benzenemethanol, 4-(dimethylamino)-alpha,alpha-bis(4-(dimethylamino)phenyl)-Ferrate(1-), bis[2[(4-amino-2-hydroxyphenyl)azo] chlorophenolato(2-)]-, N,N,N'N'-tetrakis[mixed 3-butoxy-2-hydorxypropyl and 2-hydroxy-3-(octyloxy) propyl]derivs., hydrogen compounds with N-butyl-1-butanamine,
    a CI Solvent Black—1,3-Benzenediamine, 4,4'-[(4-methyl-1,3-phenylene)bis(azo)]bis[6-methyl-C.I. Solvent Black 7
    a CI Solvent Red—Amines, C12-C14-tert-alkyl, bis[2-[(2-hydroxyphenyl)azo]-3-oxo-N-phenylbutamidato(2-)-cobaltate (1-) (1:1) Spiro(isobenzofuran-1(3H), 9'-(9H) xanthen)-3-One, 3', 6'bis(diethylamino),
    a CI Solvent Yellow—Phenol, 2,6-bis(1-methylpropyl)-4-[(4-nitrophenyl)azo],
    a CI Solvent Yellow—Phenol, 2,6-bis(1-methylpropyl)-4-[(3-nitrophenyl)azo],
    a CI Solvent Yellow—Phenol, 2,6-bis(1-methylpropyl)-4-[(3-nitro-4-chloro-phenyl)azo],
    a CI Solvent Yellow—Phenol, 2,6-bis(1-methylpropyl)-4-[(2,4-dinitro-phenyl)azo], a CI Solvent Yellow—Phenol, 2,6 Disecbutyl-4(3,4 Dichloro Phenyl Azo),
a CI Solvent Yellow—Phenol, 2,6 Disecbutyl-4-(2-Nitro Phenyl Azo),
a CI Solvent Yellow—Phenol, 2,6 Disecbutyl-4-(2-chloro-4-Nitro Phenyl Azo,
a CI Solvent Green—9,10 Anthracenedione, 1,4 (dodecylphenyl),
and their blends.

* * * * *